(12) United States Patent
Satzoda et al.

(10) Patent No.: US 10,576,974 B2
(45) Date of Patent: Mar. 3, 2020

(54) MULTIPLE-PARTS BASED VEHICLE DETECTION INTEGRATED WITH LANE DETECTION FOR IMPROVED COMPUTATIONAL EFFICIENCY AND ROBUSTNESS

(71) Applicant: The Regents of The University of California, Oakland, CA (US)

(72) Inventors: Ravi Kumar Satzoda, San Diego, CA (US); Mohan M. Trivedi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 260 days.

(21) Appl. No.: 15/197,655

(22) Filed: Jun. 29, 2016

(65) Prior Publication Data

US 2016/0375904 A1 Dec. 29, 2016

Related U.S. Application Data

(60) Provisional application No. 62/186,217, filed on Jun. 29, 2015.

(51) Int. Cl.
| | |
|---|---|
| *B60W 30/095* | (2012.01) |
| *G06K 9/00* | (2006.01) |
| *G06K 9/46* | (2006.01) |
| *G06K 9/62* | (2006.01) |

(Continued)

(52) U.S. Cl.
CPC ........... *B60W 30/0956* (2013.01); *B60R 1/00* (2013.01); *B60R 11/04* (2013.01); *G06K 9/00798* (2013.01); *G06K 9/00805* (2013.01); *G06K 9/4604* (2013.01); *G06K 9/6201* (2013.01); *G06K 9/6267* (2013.01);
(Continued)

(58) Field of Classification Search
None
See application file for complete search history.

(56) References Cited

U.S. PATENT DOCUMENTS

2007/0255480 A1* 11/2007 Southall .................... B60T 7/22
701/96
2008/0273752 A1* 11/2008 Zhu ....................... B60W 40/02
382/103

(Continued)

OTHER PUBLICATIONS

Chen et al., "Vehicle make and model recognition using sparse representation and symmetrical SURFs", Jan. 14, 2015, Pattern Recognition, vol. 48, pp. 1979-1998. (Year: 2015).*

*Primary Examiner* — Kaitlin A Retallick

(74) *Attorney, Agent, or Firm* — Mintz Levin Cohn Ferris Glovsky and Popeo, P.C.

(57) ABSTRACT

Detecting the presence of target vehicles in front of a host vehicle by obtaining, using one or more visual sensors, an image of a field of view in front of a host vehicle and detecting, individually, a plurality of parts of one or more target vehicles in the obtained image. The detected plurality of parts, of the one or more target vehicles, are extracted from the obtained image and paired to form a complete target vehicle from the plurality of parts. The pairing is only performed on selective individual parts that overlap and have similar sizes indicating that they belong to the same target vehicle. A complete target vehicle is detected in response to forming a substantially complete target vehicle.

14 Claims, 10 Drawing Sheets

(51) Int. Cl.
*B60R 11/04* (2006.01)
*B60R 1/00* (2006.01)

(52) U.S. Cl.
CPC ... *B60R 2300/303* (2013.01); *B60R 2300/307* (2013.01); *B60R 2300/804* (2013.01); *B60W 2550/308* (2013.01)

(56) References Cited

U.S. PATENT DOCUMENTS

| | | | | |
|---|---|---|---|---|
| 2010/0013908 | A1* | 1/2010 | Chiu | B60R 1/12 348/47 |
| 2011/0255743 | A1* | 10/2011 | Guan | G06K 9/00818 382/103 |
| 2013/0272577 | A1* | 10/2013 | Sakamoto | G08G 1/167 382/103 |
| 2014/0133698 | A1* | 5/2014 | Fernandez | G06K 9/00805 382/103 |
| 2014/0247996 | A1* | 9/2014 | Lin | G06K 9/4676 382/218 |
| 2015/0104098 | A1* | 4/2015 | Axelsson | G06K 9/4604 382/165 |

\* cited by examiner

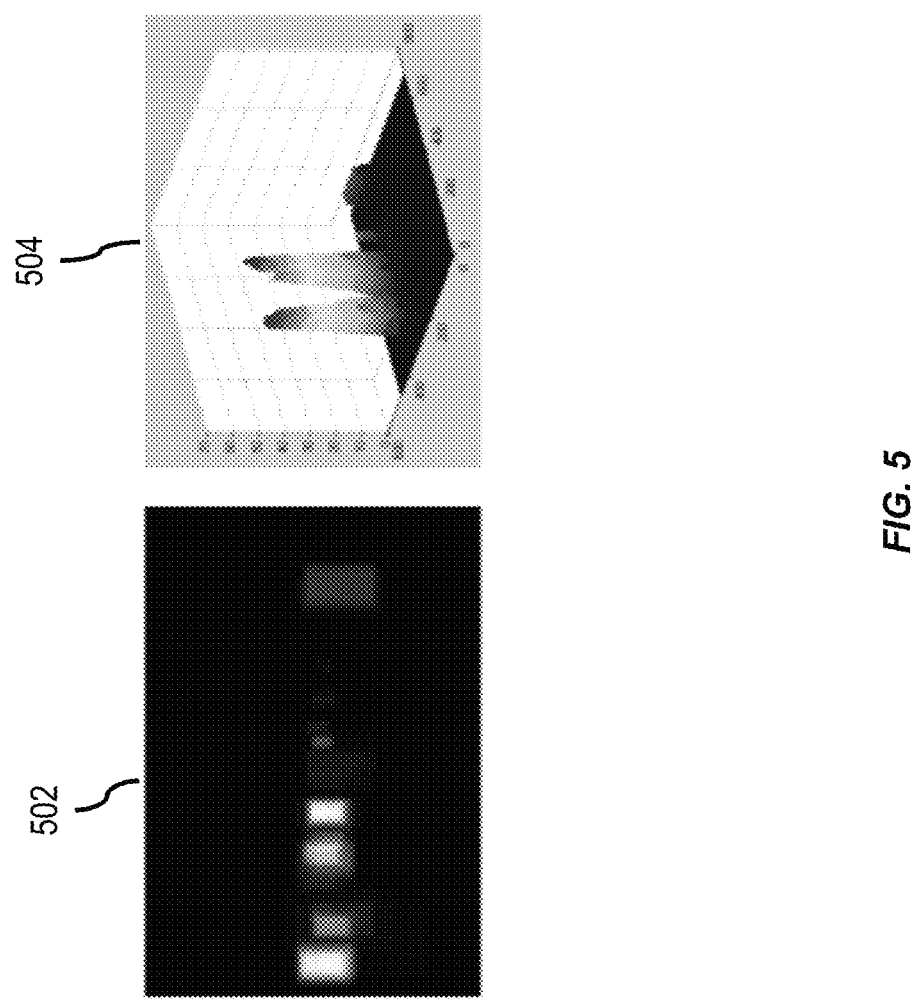

Algorithm 1 Iterative Window Search Algorithm

1: Input: $M^{P_1}, M^{P_2}, W^{P_1}, W^{P_2}$
2: Output: Full vehicle bounding boxes $\mathbf{B}^f = \{B_i^f\}$
3: for $T_b^{P_1} = T_{min}$ to $T_{max}$ do
4:   Binarize $M_B^{P_1}$: $M_B^{P_1} = M^{P_1} > T_b^{P_1}$
5:   Get set of bounding boxes $\mathbf{B}_B^{P_1} = \{B_{Bi}\}$ for each blob in $M_B^{P_1}$
6:   for $T_b^{P_2} = T_{min}$ to $T_{max}$ do
7:     Binarize $M_B^{P_2}$: $M_B^{P_2} = M^{P_2} > T_b^{P_2}$
8:     Get set of bounding boxes $\mathbf{B}_B^{P_2} = \{B_{Bj}\}$ for each blob in $M_B^{P_2}$
9:     For each $B_{Bi} \in \mathbf{B}_B^{P_1}$, find nearest similar sized $B_{Bj} \in \mathbf{B}_B^{P_2}$.
10:     for each blob pair found do
11:       Find window pairs $(B_i^{P_1}, B_j^{P_2})$ that satisfy *Symmetric condition*
12:       if *Symmetric Condition* is true then
13:         Select pair and draw full vehicle bounding box $B_i^f$
14:         Remove blob pair from $\mathbf{B}_B^{P_1}$ and $\mathbf{B}_B^{P_2}$
15:       end if
16:     end for
17:     Break if no blobs in $B_B^{P_2}$
18:   end for
19:   Break if no blobs in $B_B^{P_1}$
20: end for

FIG. 6

Figure 4. Lane detection using vehicle detection

MULTIPLE-PARTS BASED VEHICLE DETECTION INTEGRATED WITH LANE DETECTION FOR IMPROVED COMPUTATIONAL EFFICIENCY AND ROBUSTNESS

CROSS-REFERENCE TO RELATED APPLICATIONS

This application claims the benefit of and priority to U.S. Provisional Patent Application No. 62/186,217, titled "Multiple-Parts Based Vehicle Detection Integrated With Lane Detection for Improved Computational Efficiency and Robustness," which was filed on Jun. 29, 2015, the contents of which is incorporated herein in its entirety for all purposes.

TECHNICAL FIELD

The subject matter disclosed herein relates to vehicle detection.

SUMMARY

In one aspect, there is provided a method. The method may include vehicle detection and, in particular, processes that integrate lane detection and vehicle detection algorithms. There may also be provided detection of parts of vehicles. Moreover, an iterative window search algorithm and/or a symmetry regression model may also be used to detect vehicles. Furthermore, a two-step training algorithm may also be provided.

In one aspect, a method is provided for detecting target vehicles in front of a host vehicle. The method can include one or more operations including obtaining, using one or more visual sensors, an image of a field of view in front of a host vehicle. A plurality of parts of one or more target vehicles are detected in the obtained image. The plurality of parts may be separately detected. Images of the detected plurality of parts are extracted from the obtained image. The extracted images of the plurality of parts are paired to form a substantially complete target vehicle from the plurality of parts. The presence of a complete vehicle is detected based on the forming of a substantially complete target vehicle.

In some variations, one or more of the following operations may be performed. Detecting a plurality of parts of one or more target vehicles can include detecting a right side of a target vehicle using Haar-Adaboost cascades, and detecting a left side of the target vehicle using Haar-Adaboost cascades. The cascades can be trained using a modified Active learning methodology. Pairing the extracted images of the plurality of parts can include using iterative voting techniques to identify segments of the obtained image that contain at least one part of the plurality of parts of a target vehicle. Pairing the extracted images of the plurality of parts can include using symmetry regression models to associate the plurality of parts to form a complete target vehicle.

The plurality of parts of a target vehicle can include a left-hand part and a right-hand part of a target vehicle. The symmetry regression models can be used to match the right-hand part with the left-hand part.

Detecting a plurality of parts of one or more target vehicles can include assigning sets of pre-established classifier windows to the obtained image, each set of classifier windows can be associated with a part of the plurality of parts of the one or more target vehicles. Window voting maps can be generated for each set of classifier windows. Thresholds can be applied to each window voting map to limit the number of classifier windows. Blobs of sets of classifier windows can be generated, each blob associated with a bounding box around the blob. Blobs having different parts of a target vehicle of the one or more target vehicles can be matched and the presence of a target vehicle can be determined based on sufficient blobs being matched to form a substantially complete target vehicle. A substantially complete vehicle can include includes a target vehicle having above a preset threshold of matched parts.

For individual sections of the obtained image, a determination can be made whether the section of the obtained image contains a trigger part of at least one of the one or more target vehicles. The detecting of a plurality of parts of one or more target vehicles can be triggered responsive to the detection of the trigger part.

In some variations, lane features of a road between the host vehicle and one or more detected complete target vehicles can be detected within the obtained image. The detecting of the lane features can be performed by analyzing a plurality of horizontal band disposed in the obtained image between the host vehicle and a nearest detected complete target vehicle that is in front of the host vehicle.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 illustrates a two-dimensional window voting map and a three-dimensional window voting map for the sets of classifier windows illustrated in FIG. 4;

FIG. 6 is an illustration of exemplary code for implementing an iterative search of the classifier windows;

DETAILED DESCRIPTION

On-road vehicle detection and lane detection are tasks that may be used in vision-based active safety systems for vehicles. With emerging hybrid and electric vehicles that rely on battery power, advanced driver assistance systems may be designed such that they are power efficient. Therefore, computational efficiency of the inherent algorithms is one of the components in the design of these algorithms.

The subject matter disclosed herein includes a vehicle detection algorithm with lane detection such that there may be, in some implementations, improved computational efficiency without compromising the robustness of both lane and/or vehicle detection. This computational efficiency may enable embedded realization of systems for in-vehicle electronic systems.

The subject matter disclosed herein facilitates the detection of vehicles with low false detection rate and acceptable levels of true detection rate. The computational efficiency may be realized through a reduction in the number of false positives detected by the on-road vehicle detection systems. A false positive occurs when the on-road vehicle detection systems determine that there is a vehicle in the path and/or vicinity of the on-road vehicle detection systems when there are none.

Figure 1:
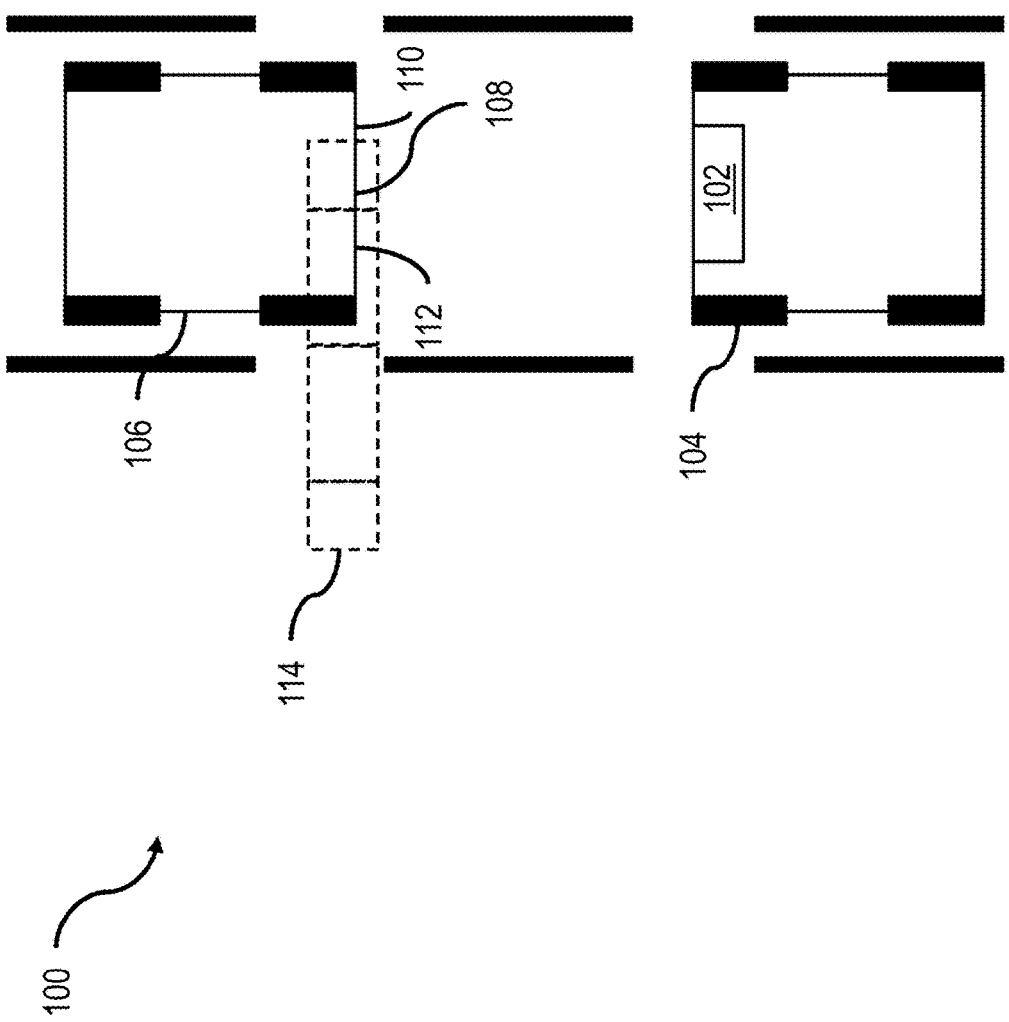
FIG. 1 is a schematic illustration of a system having one or more features consistent with the present description.

FIG. 1 is a schematic illustration of a system 100 having one or more features consistent with the present description. The subject matter disclosed herein introduces a part-based on-road vehicle detection technique, which detects vehicles that are fully visible and detects vehicles that are partially visible. In one variation, an on-road vehicle detection system 102 can be mounted to a host vehicle 104. The on-road vehicle detection system 102 can be configured to individually identify a plurality of vehicle parts of a target vehicle 106. A target vehicle 106 can be any vehicle within the field-of-view of the on-road vehicle detection system 102.

In some variations, the on-road vehicle detection system 102 can be configured to detect the presence of a rear portion 108 of a target vehicle 106 in front of the host vehicle 102. The on-road vehicle detection system 102 can be configured to separately detect a plurality of parts of the rear portion 108 of the target vehicle 106. For example, the on-road vehicle detection system 102 can be configured to separately detect a right rear portion 110 and a left rear portion 112 of the target vehicle 106.

In the event that the detected target vehicle 106 does not include a right portion 110 and a left portion 112 the on-road vehicle detection system 102 can be configured to flag the detected target vehicle 106 as a false detection. A target vehicle target vehicle 106, that is in front of the host vehicle 104, is likely to always include, unless obstructed, a right rear portion 110 and a left rear portion 112.

In some variations, the on-road vehicle detection system 102 can be configured to detect the multiple portions of the target vehicle 106 can be detected using a sliding window approach as described below. Individuals windows can be extracted to verify the existence of a portion of the target vehicle 106 within the extracted window.

The on-road vehicle detection system 102 can be include a visual sensor. A visual sensor can include a camera, a CCD, CMOS, NMOS, Live MOS, an infrared sensor, LIDAR, or the like. The visual sensor can be configured to detect visual data associated with the field-of-view of the on-road vehicle detection system 102 in front of the host vehicle host vehicle 104 to form images of the field of view in front of the host vehicle 104. The on-road vehicle detection system 102 can be configured to perform image analysis techniques on the formed image of the field of view in front of the host vehicle 104.

Figure 2:
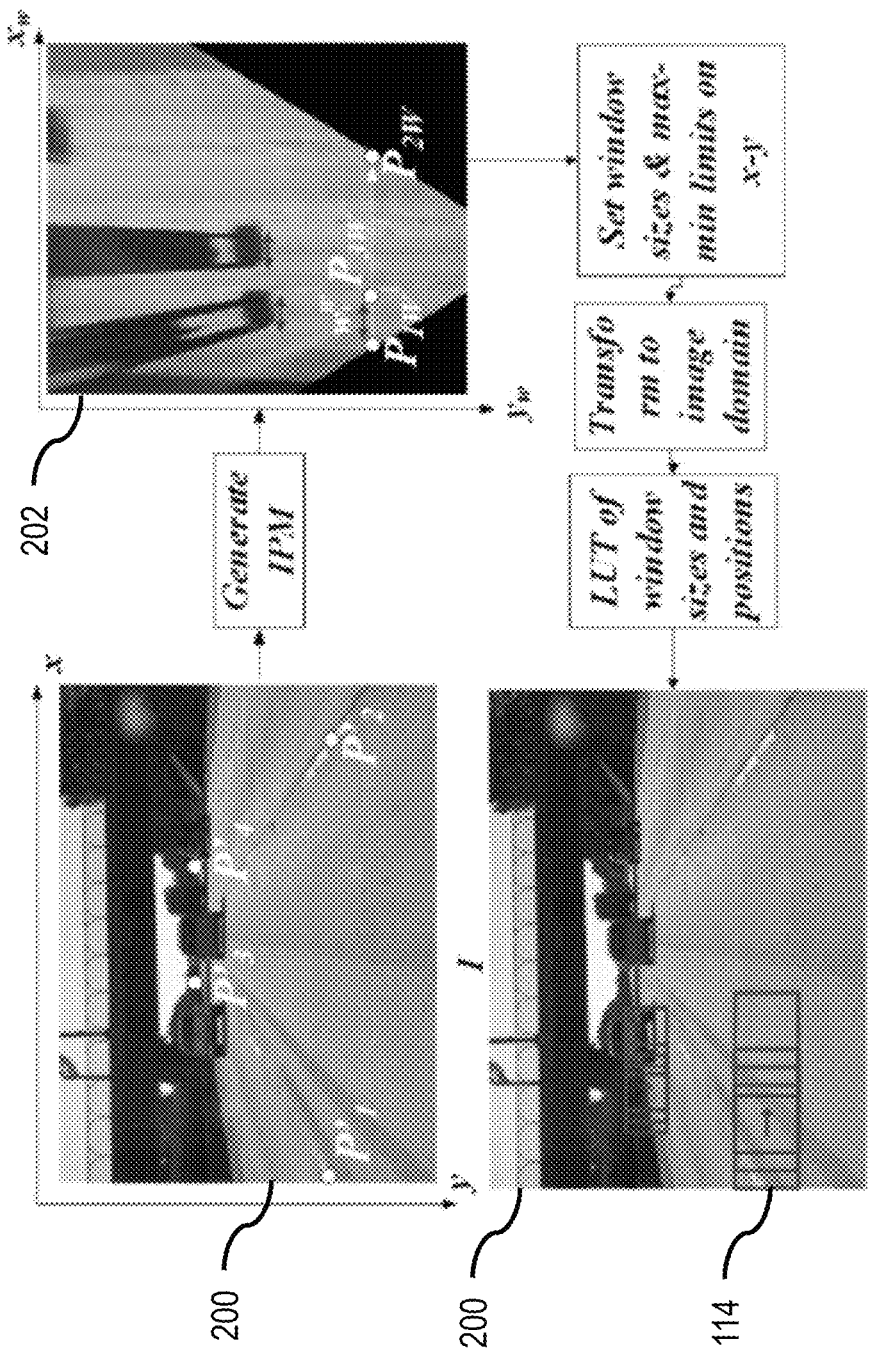
FIG. 2 is an illustration of the process for generating classifier windows within an image, the process having one or more features consistent with the present description.

The on-road vehicle detection system 102 can be configured to generate a plurality of virtual classifier windows 114 within the formed image. FIG. 2 is an illustration of the process for generating classifier windows 114 within an image 200. The image 200 being obtained using an on-road vehicle detection system 102 having one or more features consistent with the present description.

Most of the image 200 contains no information that is useful in the determination of whether a vehicle is in front of the host vehicle 104. The image 200 can be split into multiple windows. Only some of those windows will contain information that is pertinent to the detection of a target vehicle 106 in front of the host vehicle 104. The size of these windows must be determined. When the window is too big, too much of the image is obtained and a processor associated with the on-road vehicle detection system 102 must analyze a much larger portion of the image 200 than is necessary. This process is not necessary for the vehicles that are far away from the host vehicle 104 in the image 200. In collision avoidance systems, vehicles that are far away need not be analyzed because the likelihood of a collision with those vehicles is low. A window that is too small will not contain enough features that the on-road vehicle detection system 102 can use to determine the content of the window. Consequently, small windows need not be processed in the image 200 to detect a target vehicle 106 that is close to the host vehicle 104.

The window sizes can be determined for the image 200 by applying inverse perspective mapping (IPM) to the image to compute a look-up table (LUT) that contains possible window sizes for image 200. The window sized can be based on the specific camera calibration information of the image sensor used to obtain the image 200. The LUT generation step can be a one-time offline step based on the parameters of the camera used by the on-road vehicle detection system 102 to obtain the image 200. The parameters of the camera can be used to generate camera calibration parameters. The camera calibration parameters can reflect the calibration needed to determine correlate a point within the image 200 with a distance in front of the host vehicle 104.

In some variations, the LUT generation step uses the lane calibration information to generate a look up table (LUT) that holds the different window sizes for each y-coordinate in the image domain. This generation of LUT enables elimination of a so-called "blind-folded" approach of applying unwarranted multiple scaled windows on the entire image. Instead, the window scales using the LUT which is defined such that only the necessary scaled windows are processed. This process may, in some implementations, reduce the number of windows to processes by for example one or more orders of magnitude.

The on-road vehicle detection system 102 can be configured to generate a homography matrix H. The on-road vehicle detection system 102 can use the camera calibration parameters to convert camera coordinate system (CCS), or image domain, into world coordinate system (WCS), or top view. For example, given an input image 200, the IPM image 202 is generated using the homography matrix H. Consequently, every point P(x,y) in the image 200 is transformed to the point $P_w$ in image 202 using the homography matrix H. A mathematical representation of transformation can include:

$$[x_w y_w 1]^T = kH[xy1]^T$$

where K is the calibration constant based on the camera calibration parameters. From this the locations of the minimas and maximas in IPM image, image 202, can be determined to yield those positions in the image domain, i.e. in the image 200. The positions in the image 200 that correspond to the maximas and minimas in the IPM image can be denoted as points $P'_1$, $P'_2$, $P'_3$ and $P'_4$ within the image 200. For each row in image 202, point $P_{3w}$ can be determined. $P_{3w}$ can be determined using the equation $P_{3w} - P_{1w} = w_V^W$. $w_V^W$ is the width of a vehicle in WCS, i.e., as seen from top view. Most consumer vehicles have similar axle lengths. The length of the axle on most consumer vehicles is approximately the same width as the vehicle. Consequently, by fixing the length of the axle $w_V^W$ at an estimated length, $P_{3w}$ can be determined.

Given $P_{1w}$ and $P_{3w}$, in the IPM domain, the inverse of H, i.e. $H^{-1}$, can be used to determine the corresponding points $P_1$ and $P_3$ in the image domain. For each row index y in image 200, the LUT has the following list of values:

$$w_V(y) = x_3 - x_1$$

where $w_V(y)$ is the width of the virtual window that should be used for vehicle detection in the y-th row of image 200.

Figure 3:
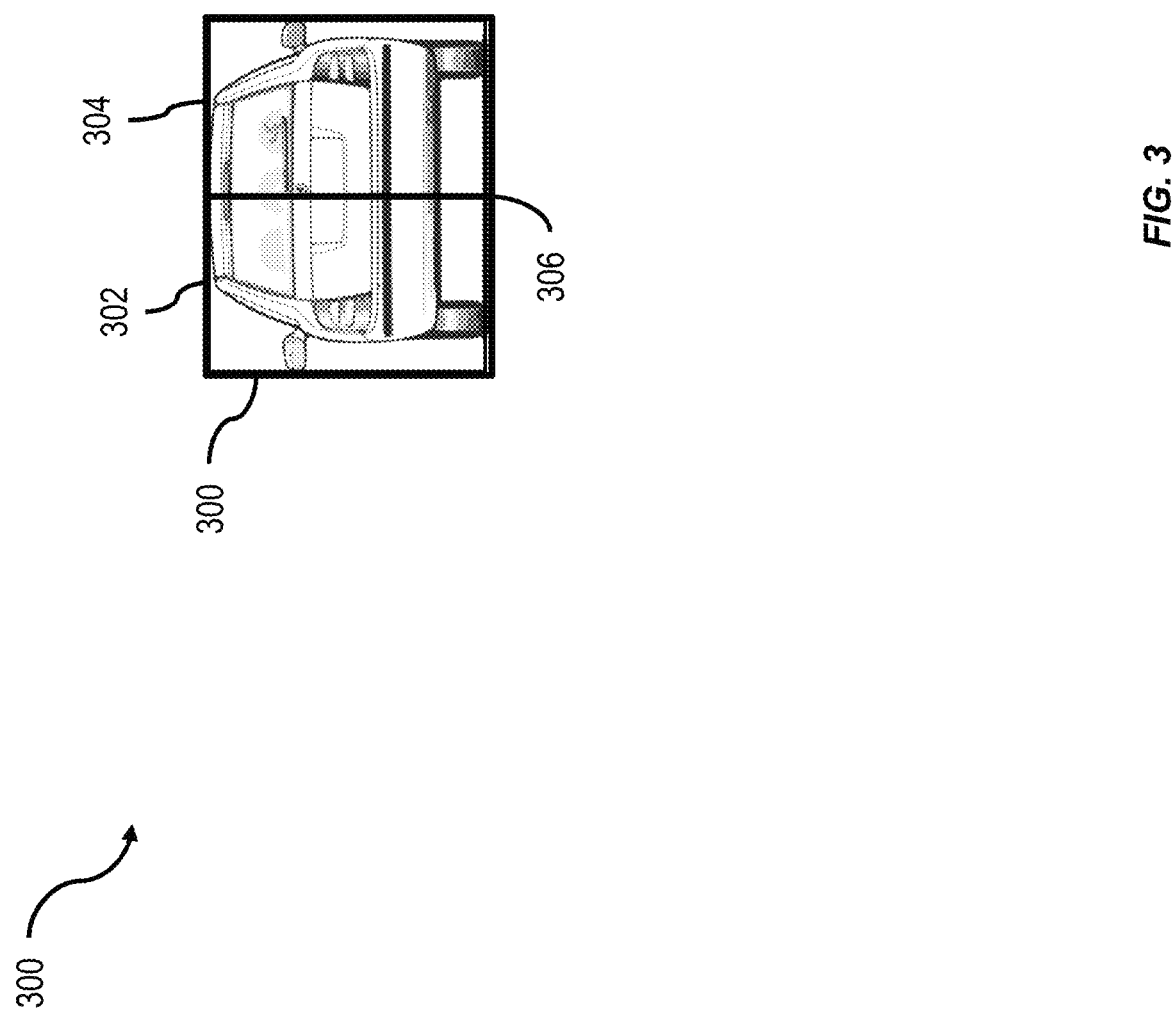
FIG. 3 is an illustration of an image of a target vehicle in front of a host vehicle host vehicle.

FIG. 3 is an illustration of an image 300 of a target vehicle 106 in front of a host vehicle 104. The image of the target vehicle 106 has been divided into two parts, a left part 302 and a right part 304. A sliding window approach may be used to classify multi-scaled windows of a given input image frame as left parts or right parts using the classifiers $C_2^{P1}$ and $C_2^{P2}$. Applying the classifiers results in multiple windows that are detected in and around the vehicle left parts or right parts of the vehicle. Image analysis can be performed on the left part 302 of the image 300 to determine whether a recognizable object is within the left part 302 of the image 300. A recognizable object can be an object having an outline that conforms, within a threshold, to a known shape, matches, within a threshold, sample images stored in memory of the on-road vehicle detection system 102, or the like. In this case, the left part 302 of the image 300 conforms to a left rear portion of a sedan motor vehicle. Similarly, the right part 304 of the image 300 conforms to a right rear portion of a sedan motor vehicle.

Multiple sets of virtual classifier windows 114 can be generated, one set for each of the multiple parts of the vehicles to be detected. For example, a set of classifier windows 114, $B^{P1}$, can be generated for the left part 302 of the image 300 of the target vehicle 106 and a set of classifier windows 114, $B^{P2}$, can be generated the right part 304 of the image 300 of the target vehicle target vehicle 106. For every $B_i^{Pj}$-th window of the set of classifier windows 114, $\delta_w$ can be determined, where $$\delta_w = |w_V(y) - 2w_i^{Pj}(y_i^{Pj} + h_i^{Pj})|$$

where $w_i^{Pj}$ is the width of th window $B_i^{Pj}$ whose bottom left corner is at coordinate $y = y_i^{Pj} + h_i^{Pj}$.

In some variations, where $\delta_w$ is determined to be too small for a particular classifier window 114, the classifier window 114 can be considered for further processing. This may occur, for example, in the event that $\delta_w < 10$.

Figure 4:
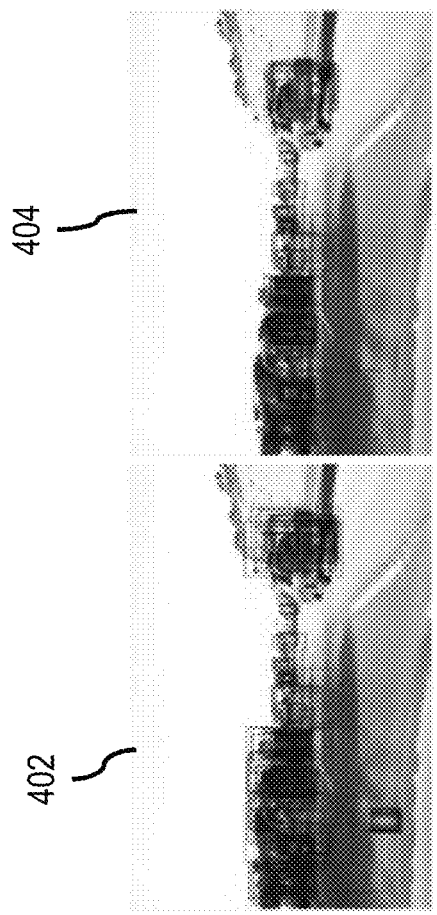
FIG. 4 illustrate classifier windows generated for an image prior to application of the classifier window size constraints and after application of classifier window size constraints.

FIG. 4 illustrate classifier windows 114 generated for an image prior to application of the classifier window 114 size constraints and after application of classifier window 114 size constraints. At 402, classifier windows 114 have been generated for an image obtained by a on-road vehicle detection system 102 on a host vehicle 104. The classifier windows 114 shown at 402 are for the right portion 304 of the target vehicles 106 only. At 404, the classifier windows 114 have been generated for the same image, however, the size constraints for the classifier windows 114 have been applied. The size constraints being, for example, $w_V(y)$ and $\delta_w$. It can be seen that the small windows close to the host vehicle 104 have been removed between the image at 402 and the image at 404. Furthermore, the number of classifier windows 114 has significantly reduced, thereby increasing the efficiency of follow-on image processing.

Following the generation of the classifier windows 114 based on the calibration parameters associated with the visual sensor that obtained the images, the on-road vehicle detection system 102 can be configured to determine the combinations of classifier windows 114 that each contain a part of a vehicle to form a whole vehicle.

An iterative window search algorithm with symmetric regression model may be used to identify pairs of left and right vehicle parts that must be combined together to confirm the presence of a vehicle.

The on-road vehicle detection system 102 can be configured to generate a window voting map for each part of the vehicle. For example, when the on-road vehicle detection system 102 is configured to determine the right rear portion and a left rear portion of a vehicle, the on-road vehicle detection system 102 can be configured to generate a window voting map for the sets of windows $B^{P1}$ for the left rear portion of the vehicle, and a window voting map for the sets of windows $B^{P2}$ for the right rear portion of the vehicle. The sets of windows $B^{P1}$ and $B^{P2}$ contain the filtered set of classifier windows 114.

In some variations, for an image of the field of view in front of the on-road vehicle detection system 102 of the host vehicle 104, such as image 200, having a size denoted by m columns and n rows, the window voting maps can be denoted by $M^{P1}$ and $M^{P2}$, where $M^{P1}(x, y) = nif\{(x, y)|(x, y) \in nB_i^{P1} \text{windows}\}$ $M^{P2}(x, y) = nif\{(x, y)|(x, y) \in nB_i^{P2} \text{windows}\}$ FIG. 5 illustrates a two-dimensional window voting map 502 and a three-dimensional window voting map 504 for the sets of classifier windows 114 illustrated at 404 in FIG. 4. A higher value at a location (x, y) in the three-dimensional window voting map 504 indicates more classifier windows 114 are overlapping at that location. The higher the value in the voting map the greater number of classifier windows 114 have that pixel within them. This is indicative of the presence of a vehicle because more classifier windows 114 will be present when there is a vehicle in the image at that location.

The on-road vehicle detection system 102 can be configured to apply thresholds to the1 window voting maps $M^{P1}$ and $M^{P2}$. Applying thresholds to the window voting maps, by a value, can yield blobs that correspond to the minimum number of windows that overlap in the image domain, e.g., the minimum number of windows. In some variations, windows can be searched iteratively to determine the windows in the $M^{P1}$ voting map that have corresponding windows in the $M^{P2}$ voting map. A blob is a group of classification or detection windows that are clustered around the same part of a target vehicle. When a part of target vehicle is detected within a pixel a window can be generated around it. When there is a part of a vehicle in an area of the image multiple windows will cluster on and around that part. That group of windows can be referred to as a blob.

FIG. 6 is an illustration of exemplary code for implementing an iterative search of the classifier windows 114 associated with the $M^{P1}$ voting map that have corresponding windows associated with the $M^{P2}$ voting map. Each of the voting maps can thresholded with $T_b^{P1}$ and $T_b^{P2}$ from $T_{min}$ to $T_{max}$, e.g., from a lower vote count to a higher vote count. For every setting of the threshold, the each voting map generates a set of blobs $B_B^{P1}$ and $B_B^{P2}$, that contain bounding boxes for blobs that may contain classifier windows 114 having vehicles, or part thereof, within them, for the given threshold settings. A blob from $B_B^{P1}$ is paired with a blob from $B_B^{P2}$, i.e. a complete vehicle is found, if the following conditions are met:

$||(x_B^{P1}, y_B^{P1}) - (x_B^{P2}, y_B^{P2})|| < d_{max}, |w_B^{P1} - w_B^{P2}| < d_w,$
$|h_B^{P1} - h_B^{P2}| < d_h$ To pair a blob from $B_B^{P1}$ with a blob from $B_B^{P2}$, both blobs must be of similar size and placed adjacently to each other. If such pairs of blobs are found, window pairs $(B_i^{P1}, B_j^{P2})$ can be formed, such that windows $B_i^{P1}$ and $B_j^{P2}$ satisfy the following conditions:

1) Overlap with the blob from which $B_i^{P1}$ and $B_j^{P2}$ are chosen, is high.

2) Symmetry condition is met.

The first condition ensures that the windows $B_i^{P1}$ and $B_j^{P2}$ are forming the selected blob, i.e., smaller windows may also be present within a blob obtained using a lower threshold. Consequently, evaluating the size of the windows $B_i^{P1}$ and $B_j^{P2}$, with respect to the size of the blobs, ensures that the windows $B_i^{P1}$ and $B_j^{P2}$ are positioned overlapping the entire blob. The equation $||(x_B^{P1}, y_B^{P1}) - (x_B^{P2}, y_B^{P2})|| < d_{max}$ can be used to determine the overlap of the windows $B_i^{P1}$ and $B_j^{P2}$ and the blob.

The second condition is a symmetry condition. The symmetry condition is premised on the fact that most on-road fully visible vehicles have a symmetric rear profile. This premise is used to determine how best $B_i^{P1}$ with $B_j^{P2}$ in appearance. The left rear portion 302 and the right rear portion 304 of the vehicle illustrated in FIG. 3 are typically symmetric with respect to a central vertical axis 306. Consequently, the windows $B_i^{P1}$ and $B_j^{P2}$ associated with the blobs $B_B^{P1}$ and $B_B^{P2}$, are also symmetric with respect to the central vertical axis 306.

The on-road vehicle detection system 102 can be configured to check the symmetry of windows $B_i^{P1}$ and $B_j^{P2}$ by generating a bounding box $B^F$. The bounding box can be defined by: $B^F = [x^F, y^F, w^F, h^F]$. The bounding box, $B^F$, can include both windows $B_i^{P1}$ and $B_j^{P2}$ in it. The image patch $I^F$ corresponding to bounding box $B^F$ is extracted from image 200, which is divided into two equal parts along the vertical central axis 306. This results in $I_F^{P1}$ and $I_F^{P2}$, corresponding to the two parts of the bounding box, $B^F$, being extracted.

The on-road vehicle detection system 102 can be configured to divide $I_F^{P1}$ and $I_F^{P2}$ into grids. For example, $I_F^{P1}$ and $I_F^{P2}$ can be divided into 8×8 blocks. Any incomplete blocks can be padded. Each block from the left part of the bounding box, i.e. $I_F^{P1}$, is flipped and its corresponding symmetrically opposite block from the right part of the bonding box, i.e., $I_F^{P2}$ is selected.

The on-road vehicle detection system 102 can be configured to generate scaled histograms of gradient angles $h^{P1}$ and $h^{P2}$ the two selected block, one block selected and flipped from $I_F^{P1}$ and the other block selected from $I_F^{P2}$. While the description describes block from $I_F^{P1}$ being selected and flipped, the on-road vehicle detection system 102 can be equally configured to select and flip a block from $I_F^{P2}$.

The scaling can be performed using the gradient magnitudes at each pixel coordinate, whose gradient angle is used to generate the histogram of gradient angles. $h^{P1}$ and $h^{P2}$ can be normalized and a dot product can be taken to determine the symmetry score $S_{b(p,q)}$ for that pair of symmetrically opposite blocks in $I^F$, i.e.:

$$S_{b(p,q)} = \frac{h^{P1}}{||h^{P1}|| + \varepsilon} \cdot \frac{h^{P2}}{||h^{P2}|| + \varepsilon}$$

In other words, $S_{b(p,q)}$ is the dot product between the two normal histogram vectors. These scores, $S_{b(p,q)}$, are generated by the on-road vehicle detection system 102 for each of the blocks within the extracted image $I^F$. The total score for the bounding box $B^F$ that encloses the chosen windows $B_i^{P1}$ and $B_j^{P2}$ is determined by the on-road vehicle detection system on-road vehicle detection system 102, which is given by:

$$S_{I^F} = \sum_{all\ blocks} S_{b(p,q)}$$

The symmetry score $S_{I^F}$ for the bounding box $B^F$ can be checked with one or more pre-trained linear-regression models. $S_{I^F}$ is related to both the width and height of $B^F$ in a quadratic relationship, i.e., $S_w^P = \alpha_0 + \alpha_1 w + \alpha_2 w^2$ $S_h^P = \beta_0 + \beta_1 h + \beta_2 h^2$ The coefficients $\alpha_i$ and $\beta_i$ in the above relationships can be learned using positive training annotations, examples of which are described below.

For a given $I^F$, the symmetry score is computed as $S_{f^F}$. The width and height of $I^F$ can be used by the on-road vehicle detection system 102 to determine the predicted symmetry scores using the linear regression models—$S_w^P$ and $S_h^P$, i.e., a given width and height of $I^F$. The on-road vehicle detection system 102 can be configured to find symmetry of the bounding box $B^F$ if $S_{f^F}$ lies within a threshold number of units of both $S_w^P$ and $S_d^P$. For example, the on-road vehicle detection system 102 may be configured to determine that the bounding box $B^F$ has sufficient symmetry to conclude that it bounds a whole target vehicle 106 when $S_{f^F}$ for the bounding box $B^F$ lies within 25 units of both $S_w^P$ and $S_h^P$. When this occurs, the bounding box $B^F$, is said to be finally detected.

If a final detection is found, all the blobs that lie within the finally detected bounding box, $B^F$, are eliminated from further processing. In subsequent iterations, the remaining blobs only are further thresholded and checked for the presence of vehicles. The on-road vehicle detection system 102 can be configured to terminate the iteration of the blobs when either both left and right blocks have exhausted their threshold options or there are no more blobs left in either of the parts to further process.

Figure 7:
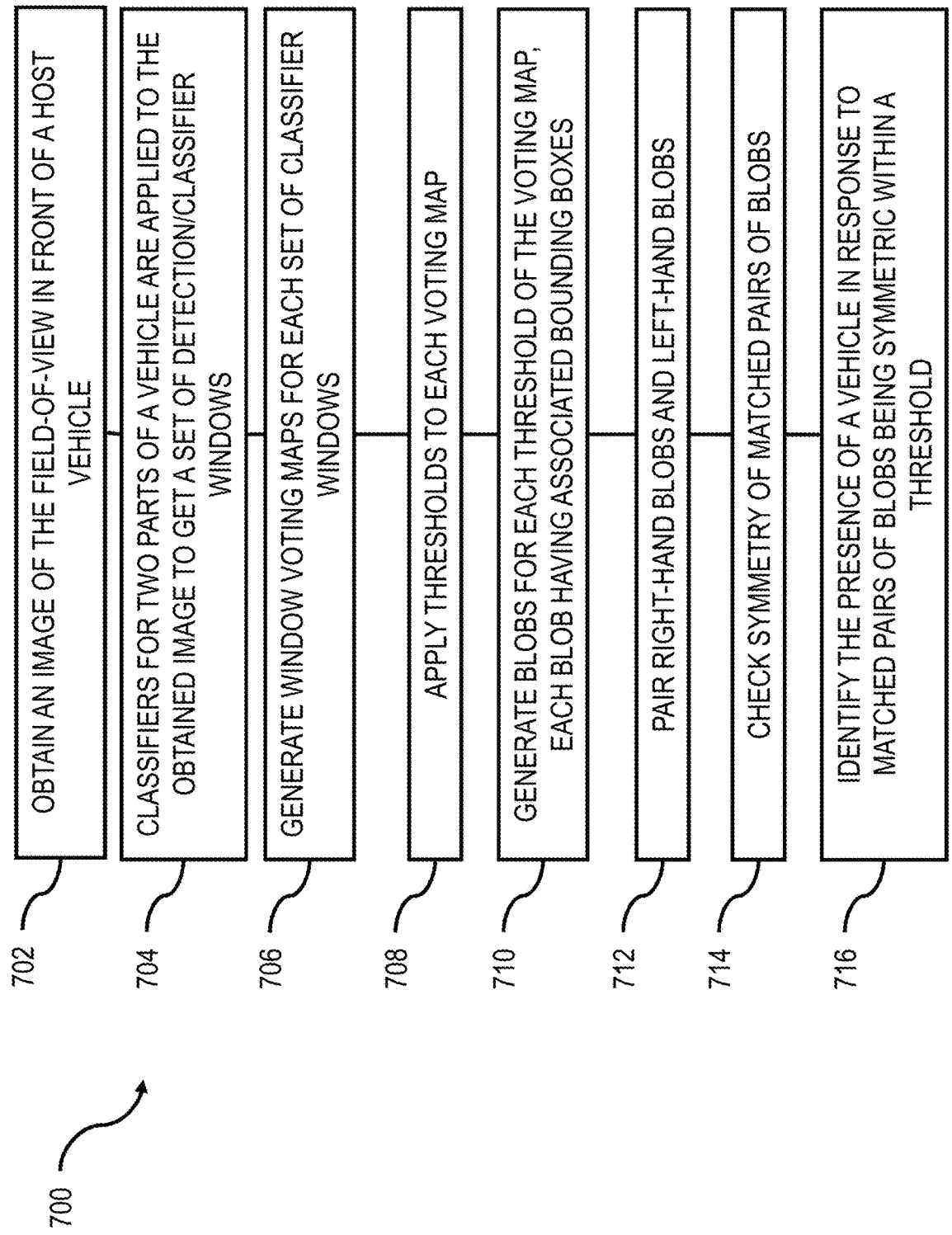
FIG. 7 illustrates a process for detecting on-road vehicles having one or more features consistent with the present description.

FIG. 7 illustrates a process 700 for detecting on-road vehicles having one or more features consistent with the present description.

At 702, an image can be obtained by a on-road vehicle detection system, such as on-road vehicle detection system 102. The image can be of a field-of-view in the direction of travel of a vehicle, such as a host vehicle. For example, when the vehicle is travelling forwards, an image can be taken of a field-of-view in front of the vehicle. The angle of the field-of-view may be determined based on a likelihood of an object causing an obstruction for the motion of the vehicle. The image may not contain information about the areas ninety degrees to the left or the right of a moving vehicle because it is unlikely that the moving vehicle would strike an object in those areas when travelling forwards.

At 704, classifiers for the two parts are applied to the image 702 to get a set of detection windows. Sets of classifier windows are then used to generate blobs. Sets of classifier windows can include a left-hand set of classifier windows and a right-hand set of classifier windows. The left-hand set of classifier windows can be assigned to the left-hand portion of a vehicle detected in the image and the right-hand set of classifier windows can be assigned to a right-hand portion of a vehicle detected in the image.

At 706, window voting maps can be generated for each set of classifier windows. Examples of window voting maps can be seen in FIG. 5 and described in the accompanying text.

At 708, thresholds can be applied to each voting map. Applying thresholds to the window voting maps, by a value, can yield blobs that correspond to the minimum number of windows that overlap in the image domain, e.g., the minimum number of windows.

At 710, blobs can be generated for each threshold of each voting map, for both right-hand voting maps and left-hand voting maps. Each of the blobs can have an associated bounding box.

At 712, right-hand blobs and left-hand blobs can be matched based on a right-hand blob and a left-hand blob being next to each other and having a similar size. For example, a blob from $B_B^{P1}$ is paired with a blob from $B_B^{P2}$, when both blobs must be of similar size and placed adjacently to each other.

At 714, a determination of symmetry between a matched right-hand blob and a left-hand blob can be made. Symmetry can be determined by dividing the blobs into blocks of equal numbers. Blocks from a blob on one side, either the left or the right, can be flipped and a determination of symmetry between a flipped block and a corresponding block on the other side can be made.

At 716, when the matched blobs are within a threshold number of units of being symmetrical it can be determined that a vehicle has been detected. For example, the on-road vehicle detection system 102 may be configured to determine that the bounding box $B^F$ has sufficient symmetry to conclude that it bounds a whole target vehicle 106 when $S_{f^F}$ for the bounding box $B^F$ lies within 25 units of both $S_w^P$ and $S_h^P$. When this occurs, the bounding box $B^F$, is said to be finally detected.

Figure 8:
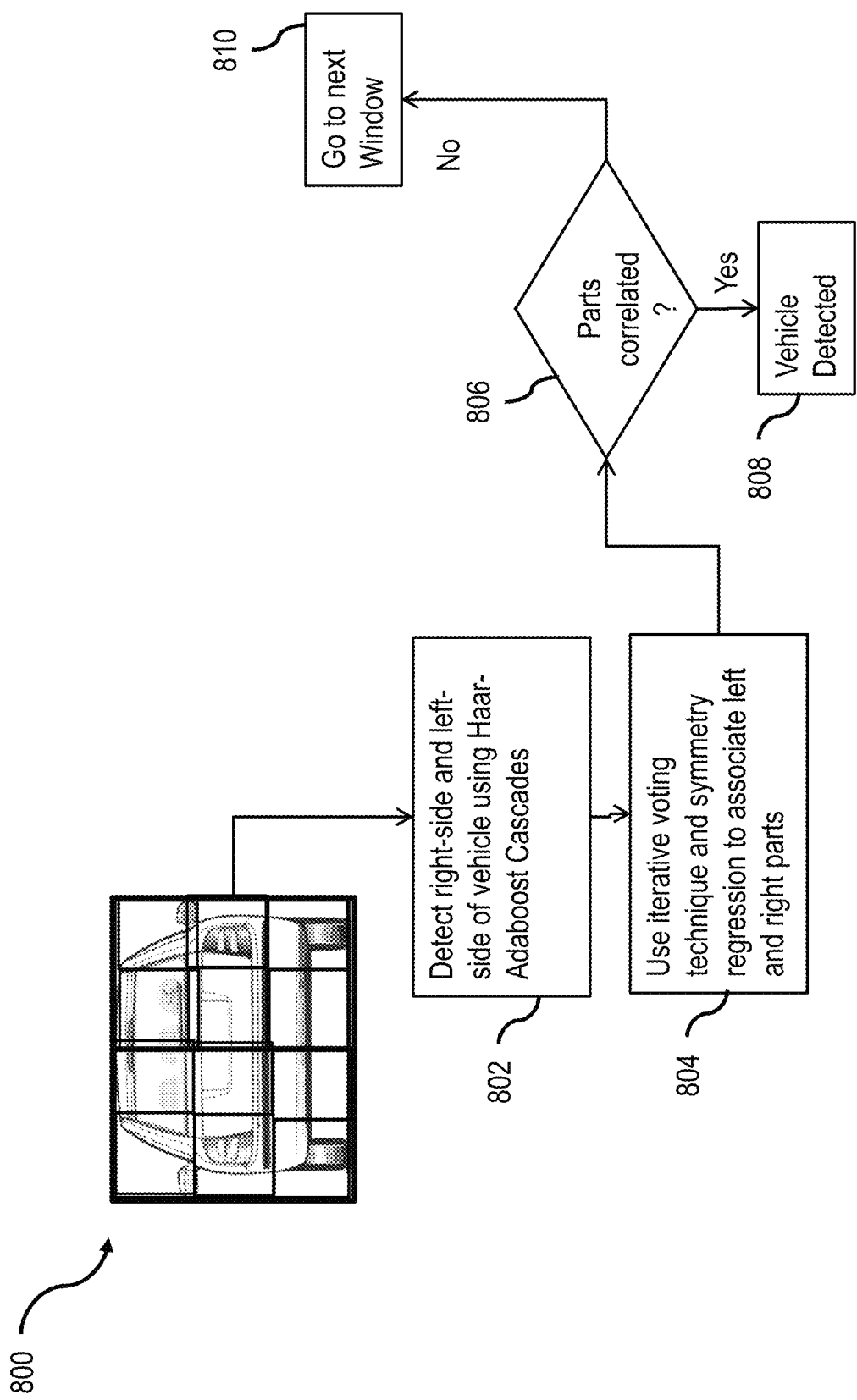
FIG. 8 illustrates a process by which an on-road vehicle detection system, having one or more features consistent with the present description, can detect vehicles.

FIG. 8 illustrates a process 800 by which an on-road vehicle detection system, having one or more features consistent with the present description, can detect vehicles.

Figure 9:
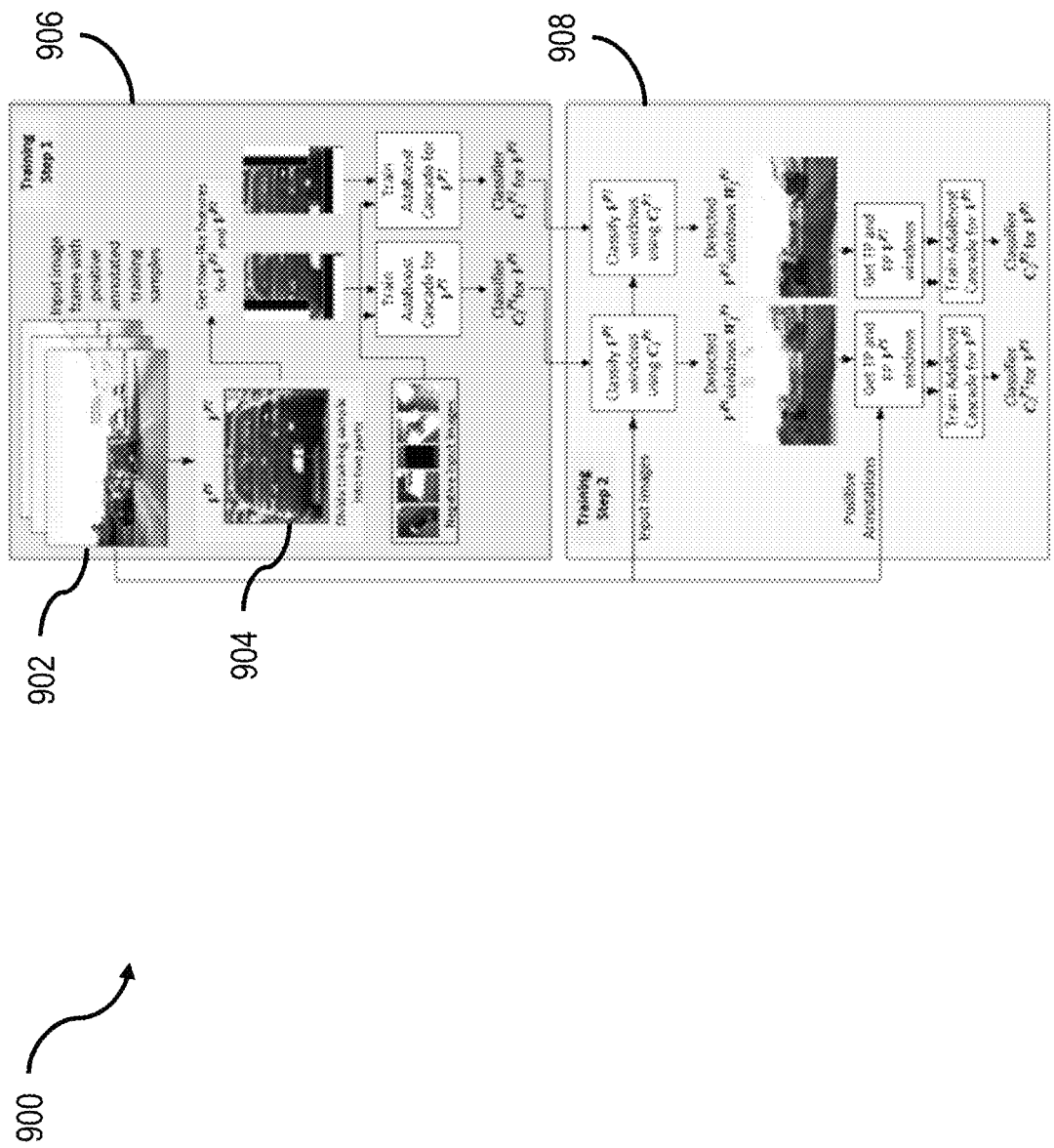
FIG. 9 illustrates a process by which an on-road vehicle detection system, having one or more features consistent with the present description, can be trained.

At 802, the right-hand side of the vehicle and the left-hand side of the vehicle can be detected using Haar-Adaboost cascades. For example, FIG. 9 illustrated a process for training a system to detect the left-hand side and right-hand side of vehicles using Harr-Adaboost cascades.

At 804, iterative voting techniques and symmetry regression models can be used to associate left-hand sides of the vehicles with right-hand sides of the vehicles. For example, FIG. 6 illustrates computer-readable code for implementing an interactive search algorithm.

At 806, a determination can be made as to whether left-hand parts of a vehicle and right-hand parts of a vehicle have been matched. For example, a blob from $B_B^{P1}$ is paired with a blob from $B_B^{P2}$, when both blobs must be of similar size and placed adjacently to each other.

At 808, in response to a match at 806, the on-road vehicle detection system can determine that a vehicle has been detected.

In response to a determination at 806 that there is no match, it can be determined that there is no vehicle in that window and the on-road vehicle detection system can, at 810, be configured to analyze the next window.

FIG. 9 illustrates a process 900 by which an on-road vehicle detection system, having one or more features consistent with the present description, can be trained.

The on-road vehicle detection system can be trained to detect vehicles using a two-step training methodology. During a typical cascade training process, positive training samples can be annotated from images, and negative training samples can be sampled randomly from images that do not contain any positive instances. The proposed training method however does not discard the remaining of the input image from which the positive samples are collected.

An input image 902 can be provided to the training framework. As illustrated in FIG. 9, the vehicle in the training sample 904 can be divided into two parts $V^{P1}$ and $V^{P2}$. Possible vehicle parts candidates can be extracted from the image. To do this, Haar-like features with an AdaBoost cascade classifier may be used in a two-step training process. The first step 906 involves training two AdaBoost classifiers that classify the Haar-like features of the two parts $V^{P1}$ and $V^{P2}$ of the vehicle independently. The positive training samples for this step involve annotated vehicle windows as shown in FIG. 9 and negative samples that are randomly generated from images that do not have any vehicles (positive samples) in them. This training yields two classifiers $C_1^{P1}$ and $C_1^{P2}$ corresponding to the two parts $V^{P1}$ and $V^{P2}$, where subscript 1 denotes the first step classifiers.

In the second training stage 908, the AdaBoost cascades are trained but with more informed and selective positive and negative samples. A multi-scale sliding window approach is applied on the training image set to generate Haar-like features, which are then classified using the classifiers from first step, i.e., $C_1^{P1}$ and $C_1^{P2}$. $C_1^{P1}$ and $C_1^{P2}$ are applied to the Haar-like features generated from input images that were previously annotated with positive vehicle samples. It should be noted that the entire training image and not just the previously annotated window is sent for classification in the second training step 908. This classification results in two sets of windows $W_1^{P1}$ and $W_1^{P2}$ for $V^{P1}$ and $V^{P2}$. These windows are then filtered as true positives and false positives using the annotations for positive samples that were previously used to train in the first training step 906.

The positive and negative windows selected using the above method are then used to extract Haar-like features, which are then used to train two AdaBoost cascade classifiers $C_2^{P1}$ and $C_2^{P2}$. During testing phase, $C_2^{P1}$ and $C_2^{P2}$ are used to generate two sets of hypothesis windows $B^{P1}$ and $B^{P2}$ for the next stage of hypothesis verification, where $$B^{P1} = \{B_1^{P1}, B_2^{P1}, \ldots, B_{N_{P1}}^{P1}\}$$

$$B^{P2} = \{B_1^{P2}, B_2^{P2}, \ldots, B_{N_{P2}}^{P2}\}$$

In the above equations, $B_i^{Pj}$ represents i-th window for j-th part and $N_{p1}$ and $N_{p2}$ denote the number of windows for the two parts respectively. A window $B_i^{Pj}$ is characterized by the usual notation of a bounding box, i.e. $B_i^{Pj} = [x_i, y_i, w_i, h_i]$ where $(x_i, y_i)$ denotes the top left corner of the bounding box with respect to the top left corner of the input image, and the bounding box has a width and height of $w_i$ and $h_i$ respectively.

The subject matter disclosed herein may bring together both lane detection and vehicle detection in an integrated approach to not only increase the robustness of each of the tasks but also reduce the computational complexity of both techniques. The subject matter disclosed herein may bring may also fuse the two tasks at an algorithmic level to address both robustness and computational efficiency of the entire lane and vehicle detection systems. The subject matter disclosed herein may also provide a process for detecting parts of vehicles. Moreover, an iterative window search algorithm and/or a symmetry regression model may be used to detect vehicles.

The division of two parts of the vehicle into a left part and a right part may provide, in some implementations, an improved robustness and computational efficiency. In terms of robustness, the detection of independent parts may occur in the sequence, as described above, and may result in a reduced number of false alarms.

Figure 10:
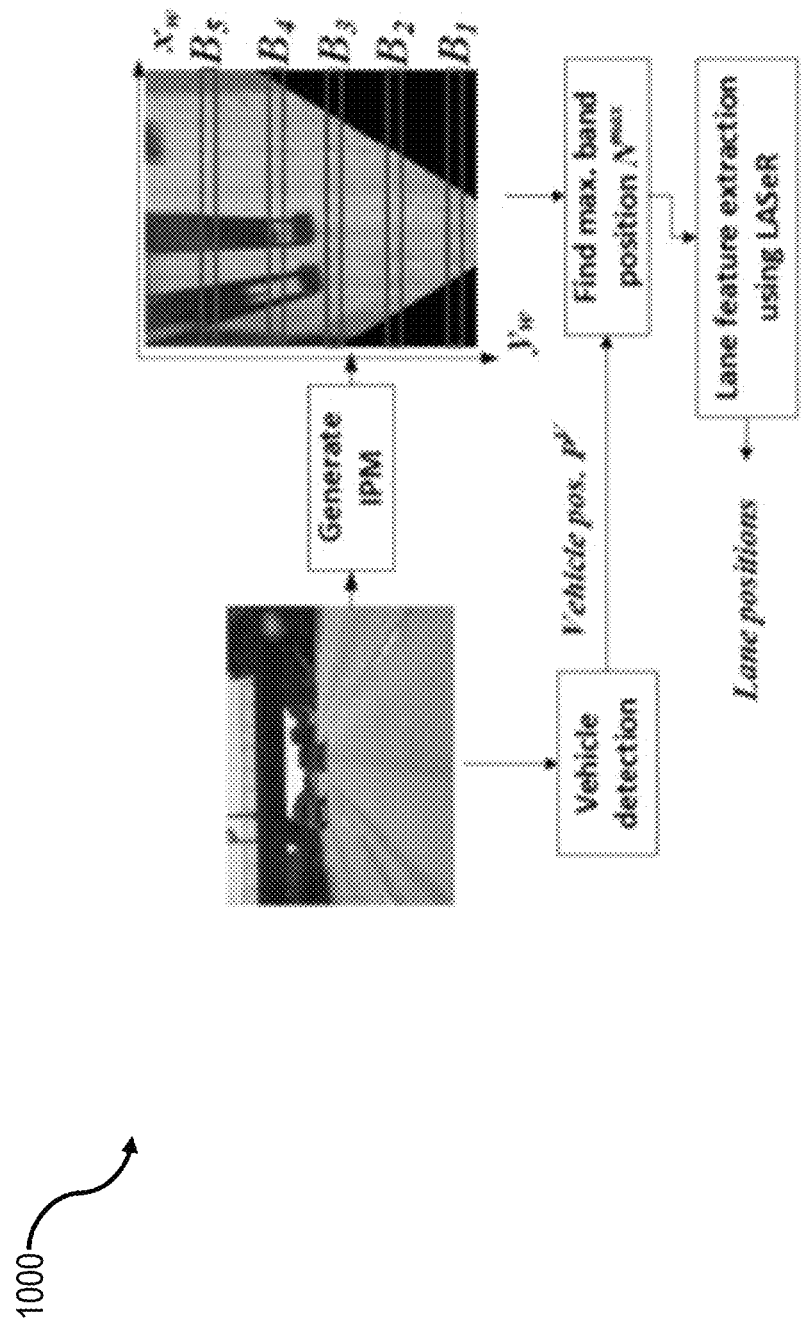
FIG. 10 is an illustration of process for detecting lane features, having one of more features consistent with the present description.

The vehicle detections from the above processes may then be used to detect the lane features in an informed and controlled manner. FIG. 10 is an illustration of process 1000 for detecting lane features, having one of more features consistent with the present description. The selective detection of lane features in a lane detection algorithm is made further selective using the vehicle detection process. In the lane detection algorithm, all scan bands $B_1$ to $B_5$, in the IPM image, may be used for lane detection. However, vehicles obstruct lanes in some of the bands. In FIG. 10, it can be seen that bands $B_4$ and $B_5$ are obstructed by vehicles. Therefore, lane features beyond an obstructed band need not be detected. The host vehicle cannot reach lane features without first contacting the obstructing vehicles. The on-road vehicle detection system is configured to facilitate collision avoidance with other vehicles, so lane detection beyond another vehicle is unnecessary. An exemplary system to perform one or or more of the operations described herein can be the ELVIS (Efficient Lane and Vehicle detection using Integrated Synergies) system.

The vehicle positions are using ELVIS to determine the maximum band positions for lane feature extraction. Lane features can be extracted using the lane detection algorithm in those specific bands only that are unobstructed by vehicles, resulting in improved computational efficiency.

In some example implementations, the subject matter disclosed herein may be used in active safety systems and advanced driver assistance systems, such as collision avoidance systems, lane change assist systems, and the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

Appendix A includes a paper titled "On-road Vehicle Detection using Multiple Parts," pages 1-10, which is incorporated herein in its entirety.

What is claimed is:

1. A method comprising:
   obtaining, using one or more visual sensors, an image of a field of view in front of a host vehicle;
   assigning a first set of classifier windows to a left portion of the obtained image and a second set of classifier windows to a right portion of the obtained image, the first set of classifier windows associated with a first part from a left side of the target vehicle, and the second set of classifier windows associated with a second part from a right side of the target vehicle;
   applying a threshold to generate a left blob that includes a first group of overlapping classifier windows from the first set of classifier windows and a right blob that includes a second group of overlapping classifier windows from the second set of classifier windows, threshold corresponding to a minimum quantity and a maximum quantity of overlapping classifier windows forming each of the left blob and the right blob;
   determining that the left blob and the right blob form a pair of symmetrical blobs based at least on the left blob being adjacent to the right blob and a difference in size between the left blob and the right blob not exceeding a threshold value, and the left blob and the right blob further being determined to form the pair of symmetrical blobs based on the left blob and the right blob being symmetrical relative to a central axis; and
   detecting, based at least on the target vehicle including more than a threshold quantity of pairs of symmetrical blobs, the presence of a complete vehicle.

2. The method of claim 1, further comprising:
   detecting the first part from the right side of the target vehicle using Haar-Adaboost cascades; and,
   detecting the second part from the left side of the target vehicle using Haar-Adaboost cascades, where the Haar-Adaboost cascades are trained using a modified active learning methodology.

3. The method of claim 1, further comprising:
   generating a first voting map for the first set of classifier windows and as second voting map for the second set of classifier windows, an iterative voting technique being applied to each of the first voting map and the second voting map in order to generate the left blob and the right blob.

4. The method of claim 1, further comprising:
   applying a symmetry regression model to determine a symmetry score for the left blob and the right blob.

5. The method of claim 3, further comprising: wherein the threshold is applied to each of the first window voting map and the second window voting map to generate the first group overlapping classifier windows comprising the left blob and the second group of overlapping classifier windows comprising the right blob.

6. The method of claim 1, further comprising:
   detecting, in the obtained image, lane features of a road between the host vehicle and the complete vehicle.

7. The method of claim 6, wherein the detecting of the lane features is performed by analyzing a plurality of horizontal band disposed in the obtained image between the host vehicle and the complete vehicle.

8. A system, comprising:
   one or more visual sensors configured to obtain an image of a field of view in front of a host vehicle;
   one or more data processors;
   a memory storing computer-readable instructions, which when executed by the one or more data processors, cause the one or more data processors to perform one or more operations comprising:
     assigning a first set of classifier windows to a left portion of the obtained image and a second set of classifier windows to a right portion of the obtained image, the first set of classifier windows associated with a first part from a left side of the target vehicle, and the second set of classifier windows associated with a second part from a right side of the target vehicle;
     applying a threshold to generate a left blob that includes a first group of overlapping classifier windows from the first set of classifier windows and a right blob that includes a second group of overlapping classifier windows from the second set of classifier windows, the threshold corresponding to a minimum quantity and a maximum quantity of overlapping classifier windows forming each of the left blob and the right blob;
     determining that the left blob and the right blob form a pair of symmetrical blobs based at least on the left blob being adjacent to the right blob and a difference in size between the left blob and the right blob not exceeding a threshold value, and the left blob and the right blob further being determined to form the pair of symmetrical blobs based on the left blob and the right blob being symmetrical relative to a central axis; and
     detecting, based at least on the target vehicle including more than a threshold quantity of pairs of symmetrical blobs, the presence of a complete vehicle.

9. The system of claim 8, further comprising:
   detecting the first part from the right side of the target vehicle using Haar-Adaboost cascades; and,
   detecting the second part from the left side of the target vehicle using Haar-Adaboost cascades, where the Haar-Adaboost cascades are trained using a modified active learning methodology.

10. The system of claim 8, further comprising:
generating a first voting map for the first set of classifier windows and as second voting map for the second set of classifier windows, an iterative voting technique being applied to each of the first voting map and the second voting map in order to generate the left blob and the right blob.

11. The system of claim 8, further comprising:
applying a symmetry regression model to determine a symmetry score for the left blob and the right blob.

12. The system of claim 8, wherein the threshold is applied to each of the first window voting map and the second window voting map to generate the first group overlapping classifier windows comprising the left blob and the second group of overlapping classifier windows comprising the right blob.

13. The system of claim 8, wherein the operations further comprise at least:
detecting, in the obtained image, lane features of a road between the host vehicle and the complete vehicle.

14. The system of claim 13, wherein the detecting of the lane features is performed by analyzing a plurality of horizontal band disposed in the obtained image between the host vehicle and the complete vehicle.

\* \* \* \* \*